United States Patent
Roddy

(10) Patent No.: US 9,895,816 B2
(45) Date of Patent: Feb. 20, 2018

(54) ERGONOMIC GLOVEBOX WORKSPACE LAYOUT TOOL AND ASSOCIATED METHOD OF USE

(71) Applicant: Consolidated Nuclear Security, LLC, Reston, VA (US)

(72) Inventor: Shannon Howard Roddy, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 128 days.

(21) Appl. No.: 15/095,655

(22) Filed: Apr. 11, 2016

(65) Prior Publication Data
US 2017/0291316 A1   Oct. 12, 2017

(51) Int. Cl.
*G01B 5/14* (2006.01)
*B25J 21/02* (2006.01)

(52) U.S. Cl.
CPC ............. *B25J 21/02* (2013.01); *G01B 5/14* (2013.01)

(58) Field of Classification Search
CPC .................................. G01B 5/14; B25J 21/02
USPC ................................ 33/1 G, 494, 679.1, 701
See application file for complete search history.

(56) References Cited

U.S. PATENT DOCUMENTS

| | | | | |
|---|---|---|---|---|
| 4,111,753 A | * | 9/1978 | Folsom | B01L 1/00 312/1 |
| 4,323,234 A | * | 4/1982 | Glaese | A63B 5/16 116/335 |
| 6,264,055 B1 | * | 7/2001 | Dozier | B25J 21/02 220/483 |
| 6,974,197 B1 | * | 12/2005 | Henry | B01L 1/50 312/1 |
| 8,865,058 B2 | * | 10/2014 | Seals | F27B 9/028 266/241 |
| 9,055,799 B2 | * | 6/2015 | Cohn | A45C 11/22 |
| 2002/0017031 A1 | * | 2/2002 | Tarver, III | G01B 3/004 33/759 |
| 2004/0149014 A1 | * | 8/2004 | Castro | G01M 3/3218 73/37 |
| 2012/0311932 A1 | * | 12/2012 | Cournoyer | B25J 21/02 49/13 |
| 2015/0168119 A1 | * | 6/2015 | French | G01B 3/1082 33/494 |

* cited by examiner

*Primary Examiner* — G. Bradley Bennett
(74) *Attorney, Agent, or Firm* — Clements Bernard Walker PLLC; Christopher L. Bernard

(57) ABSTRACT

The present invention provides an elongate tool that aides in the placement of objects and machinery within a glovebox, such that the objects and machinery can be safely handled by a user. The tool includes a plurality of visual markings (in English units, metric units, other units, grooves, ridges, varying widths, etc.) that indicate distance from the user within the glovebox, optionally broken into placement preference zones that are color coded, grayscale coded, or the like.

19 Claims, 5 Drawing Sheets

ERGONOMIC GLOVEBOX WORKSPACE LAYOUT TOOL AND ASSOCIATED METHOD OF USE

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE INVENTION

The present invention relates generally to safety equipment for use with a glovebox for handling hazardous materials in a sealed environment. More specifically, the present invention relates to an ergonomic glovebox workspace layout tool, as well as an associated method of use.

BACKGROUND OF THE INVENTION

In general, a glovebox is a sealed container that is designed to allow a user to manipulate objects within the container when a separate atmosphere is desired. These objects may be (or be associated with) hazardous chemicals, biological agents, or radioactive nuclear materials, for example. Sealed gloves or the like are built into one or more sides of the glovebox and arranged in such a manner that the user outside of the glovebox can place his or her hands into the sealed gloves and perform tasks inside the glovebox without breaking containment. Part or all of the glovebox is usually transparent to allow the user to see the objects being manipulated. Two basic types of gloveboxes exist: (1) those that allow the user to work with hazardous substances, such as hazardous chemicals, biological agents, or radioactive nuclear materials, and (2) those that allow the user to manipulate substances that must be contained within a high purity inert atmosphere, such as argon or nitrogen. It is also possible to use a glovebox for the manipulation of objects in a vacuum. In some cases, the protective shielding of the glovebox sides may be of primary importance.

The gas in a glovebox is typically pumped through a series of treatment devices that remove solvents, water, and oxygen from the gas. For example, heated copper metal (or some other finely divided metal) is often used to remove oxygen, and this oxygen removing column may be regenerated by passing a hydrogen/nitrogen mixture through it while it is heated. The water formed is passed out of the box with the excess hydrogen and nitrogen. It is common to use molecular sieves to remove water by adsorbing it in the pores of the molecular sieves. Such a glovebox is often used by organometallic chemists to transfer dry solids from one container to another, for example. An alternative to using a glovebox for air sensitive work is to employ Schlenk methods using a Schlenk line. One disadvantage of a glovebox is that organic solvents can attack the plastic seals. As a result, the glovebox may start to leak and oxygen and water can then enter the glovebox. Another disadvantage of a glovebox is that oxygen and water can diffuse through the plastic gloves. Thus, inert atmosphere gloveboxes are typically kept at a higher pressure than the surrounding air, so that any microscopic leaks are mostly leaking inert gas out of the glovebox instead of letting air in, if the type of containment allows.

Gloveboxes used for hazardous materials are generally maintained at a lower pressure than the surrounding atmosphere, so that microscopic leaks result in air intake, rather than hazard outflow. Gloveboxes used for hazardous materials generally incorporate HEPA filters or the like into the exhausts, to keep hazards contained. Gloveboxes are often used in the biological sciences, when dealing with anaerobes or high biosafety level pathogens. In applications where radiation exposure is a concern, the gloves and other components may be lead lined. Other materials used in the gloveboxes can include acrylic viewing windows and Benelex shielding composed of wood fiber and plastic that shield against neutron radiation, for example. Manipulation of the lead-lined gloves is onerous work. Some gloveboxes for radioactive work are used under inert conditions, for instance, in nitrogen-filled boxes or argon-filled boxes. The argon boxes may be fitted with a gas treatment system to keep the gas very pure to enable electrochemical experiments in molten salts, for example.

Regardless of the type of glovebox, the safe ergonomic reach of a user that takes into account the weight of an object is a significant issue. It is important that objects within a glovebox are disposed at appropriate distances such that they can be grasped, manipulated, and moved by a user without being dropped and/or resulting in user injury. Thus, what is still needed in the art is a tool that assists the user (or others) in determining where objects should be placed within a glovebox for safe handling by the user. In effect, this tool would translate existing safety guidelines and procedures related to object placement into a simple and easy to use and understand guide tool.

BRIEF SUMMARY OF THE INVENTION

In various exemplary embodiments, the present invention provides an elongate tool that aides in the placement of objects and machinery within a glovebox, such that the objects and machinery can be safely handled by a user. Optionally, this tool is made of a non-metallic material. The tool includes a plurality of visual markings (in English units, metric units, other units, grooves, ridges, varying widths, etc.) that indicate distance from the user within the glovebox, optionally broken into placement preference zones that are color or grayscale coded or the like. For example, different colored placement preference zones can have different tool widths, such that different placement preferences are immediately identifiable. These visual markings can be weight dependent, for example, and may be based on an average person or classes of average people, for example, or the visual markings can be dependent upon the type of object(s) being placed. Thus, different tools can potentially be used by different users in different applications. Preferably, the tool is simply and easily placed in and removed from a glovebox.

In one exemplary embodiment, the present invention provides an ergonomic glovebox workspace layout tool, including: an elongate body; and a plurality of visual zones defined along one or more surfaces of the elongate body, wherein the plurality of visual zones correspond to a plurality of ergonomic horizontal reach zones associated with a user. The tool also includes a plurality of visual markings disposed along one or more surfaces of the elongate body. Optionally, the elongate body is a prismatic structure. The elongate body is manufactured from one of a non-metallic material and a metallic material. Optionally, the plurality of visual zones include at least three zones indicating a preferred placement zone, a less preferred placement zone, and a disfavored placement zone. Optionally, the plurality of visual zones are color or grayscale coded. Optionally, the plurality of visual zones are sized and located according to one or more of user sex, user size, object to be placed, and application. Optionally, the tool further includes a string coupled to one end of the elongate body for withdrawing the tool from a glovebox.

In another exemplary embodiment, the present invention provides an ergonomic glovebox workspace layout method, including: providing a tool including: an elongate body; and a plurality of visual zones defined along one or more surfaces of the elongate body, wherein the plurality of visual zones correspond to a plurality of ergonomic horizontal reach zones associated with a user; disposing the tool in a glovebox; and positioning an object in the glovebox using the plurality of visual zones of the tool as guides. The tool also includes a plurality of visual markings disposed along one or more surfaces of the elongate body. Optionally, the elongate body is a prismatic structure. The elongate body is manufactured from one of a non-metallic material and a metallic material. Optionally, the plurality of visual zones include at least three zones indicating a preferred placement zone, a less preferred placement zone, and a disfavored placement zone. Optionally, the plurality of visual zones are color or grayscale coded. Optionally, the plurality of visual zones are sized and located according to one or more of user sex, user size, object to be placed, and application. Optionally, the tool further includes a string coupled to one end of the elongate body for withdrawing the tool from the glovebox. The method also includes withdrawing the tool from the glovebox subsequent to positioning the object in the glovebox using the plurality of visual zones of the tool.

BRIEF DESCRIPTION OF THE DRAWINGS

The present invention is illustrated and described herein with reference to the various drawings, in which like reference numbers are used to denote like tool components/method steps, as appropriate, and in which.

DETAILED DESCRIPTION OF THE INVENTION

Again, in various exemplary embodiments, the present invention provides an elongate tool that aides in the placement of objects and machinery within a glovebox, such that the objects and machinery can be safely handled by a user. Optionally, this tool is made of a non-metallic material. The tool includes a plurality of visual markings (in English units, metric units, other units, grooves, ridges, varying widths, etc.) that indicate distance from the user within the glovebox, optionally broken into placement preference zones that are color or grayscale coded or the like. For example, different colored placement preference zones can have different tool widths, such that different placement preferences are immediately identifiable. These visual markings can be weight dependent, for example, and may be based on an average person or classes of average people, for example, or the visual markings can be dependent upon the type of object(s) being placed. Thus, different tools can potentially be used by different users in different applications. Preferably, the tool is simply and easily placed in and removed from a glovebox.

Figure 1:
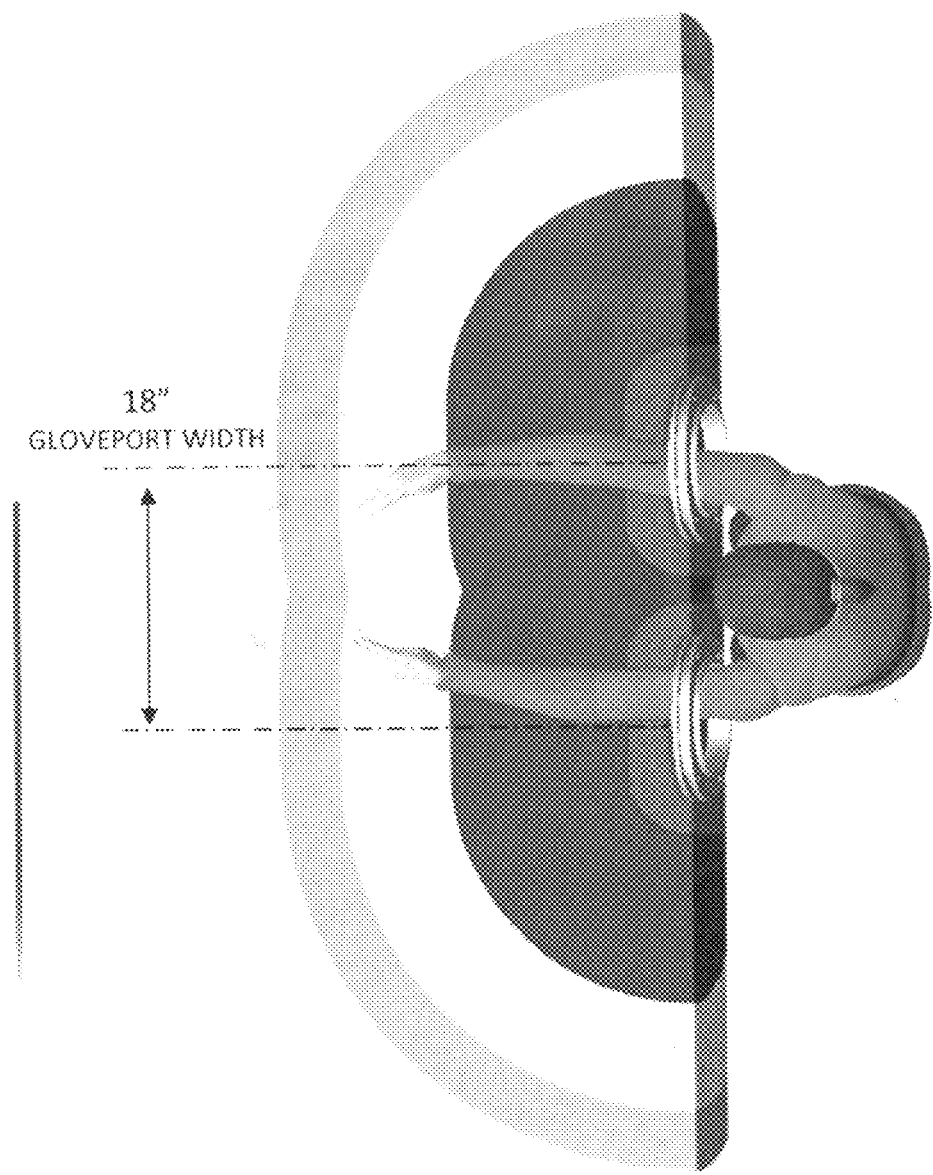
FIG. 1 is a schematic diagram illustrating one ergonomic consideration (gloveport width) associated with the use of a glovebox.
Figure 2:
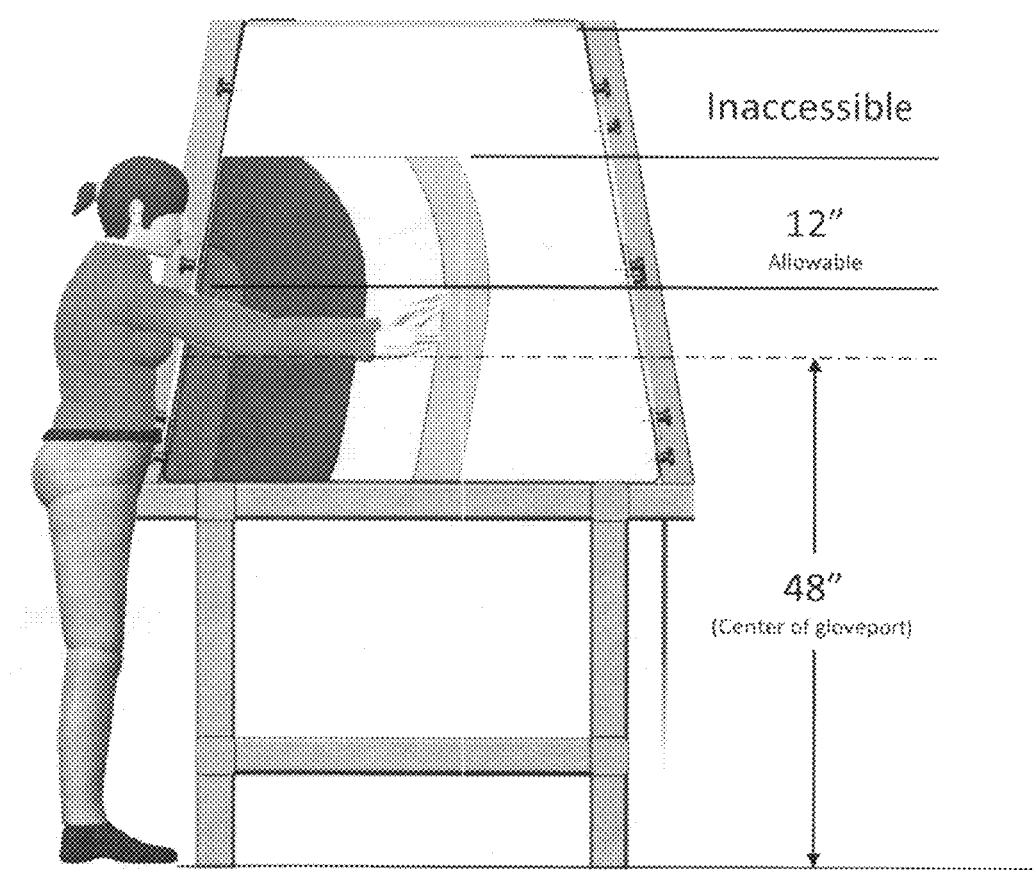
FIG. 2 is a schematic diagram illustrating one ergonomic consideration (gloveport height) associated with the use of a glovebox.

Referring now specifically to FIGS. 1 and 2, the (exemplary) preferred ergonomic horizontal reach zones for a $50^{th}$ percentile female using a glovebox are as follows:

Primary Zone—4-15 in for frequent tasks, weights up to 7 lbs single handed, weights up to 15 lbs 2 handed;

Secondary Zone—15-22 in for less frequent tasks (2-5 times per week), weights up to 5 lbs single handed, weights up to 10 lbs 2 handed;

Tertiary Zone—22-26 in for infrequent tasks (less than 1 time per month), weights up to 3 lbs single handed; and Avoid Zone—less than 4 in or greater than 26 in for any tasks.

These preferred ergonomic horizontal reach zones (or comparable preferred ergonomic horizontal reach zones) can be used to visually mark the elongate tool of the present invention.

The (exemplary) preferred vertical reach zone for a $50^{th}$ percentile female using a glovebox is based on a 12 in measurement from an apex perpendicular to the floor on which the h=glovebox stands. Inaccessible areas are outside of this 12 in zone and/or the tertiary zone described above, for example.

Figure 3:
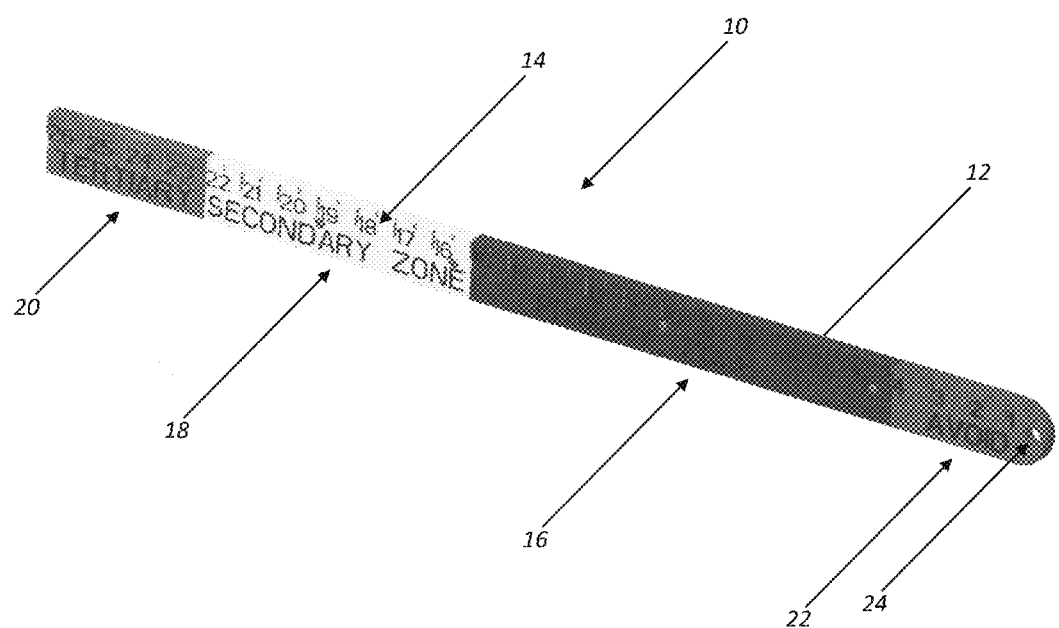
FIG. 3 is a perspective view of one exemplary embodiment of the ergonomic glovebox workspace layout tool of the present invention.

Referring now specifically to FIG. 3, in one exemplary embodiment, the tool 10 of the present invention includes an elongate prismatic body 12 having a generally square, rectangular, triangular, or trapezoidal cross-sectional shape perpendicular to the major axis thereof, for example. Optionally, the tool 10 is made of a non-metallic material, such as a plastic, or a metallic material, with material selection being dictated by the environment typically present within the glovebox for the given application. The tool 10 preferably includes a plurality of visual markings 14 (in English units, metric units, other units, etc.) printed on, formed in, or formed on one or more surfaces of the body 12 that generally indicate distance from the user within the glovebox. The plurality of visual markings 14 may be manufactured via a conventional printing technique, an etching technique, an additive manufacturing technique, etc. Optionally, the body 12 is broken into placement preference zones that are labeled and/or color/grayscale coded or the like, including the primary zone 16, secondary zone 18, tertiary zone 20, and avoid zone 22 described above, for example. These visual markings 14 provide easily discernible visual reference for the user and can be weight dependent, for example, and may be based on an average person or classes of average people, for example. The visual markings 14 can also be dependent upon the type of object(s) being placed using the tool 10. Thus, different tools 10 can potentially be used by different users in different applications. Preferably, the tool 10 is simply and easily placed in and removed from a glovebox. A hole or other retention mechanism 24 may be included for attaching a string or other handling mechanism (not illustrated) for these purposes. For convenience, the elongate prismatic body 12 may be extendable/collapsible (i.e., hinged, telescoping, retractable, flexible, etc.).

Figure 4:
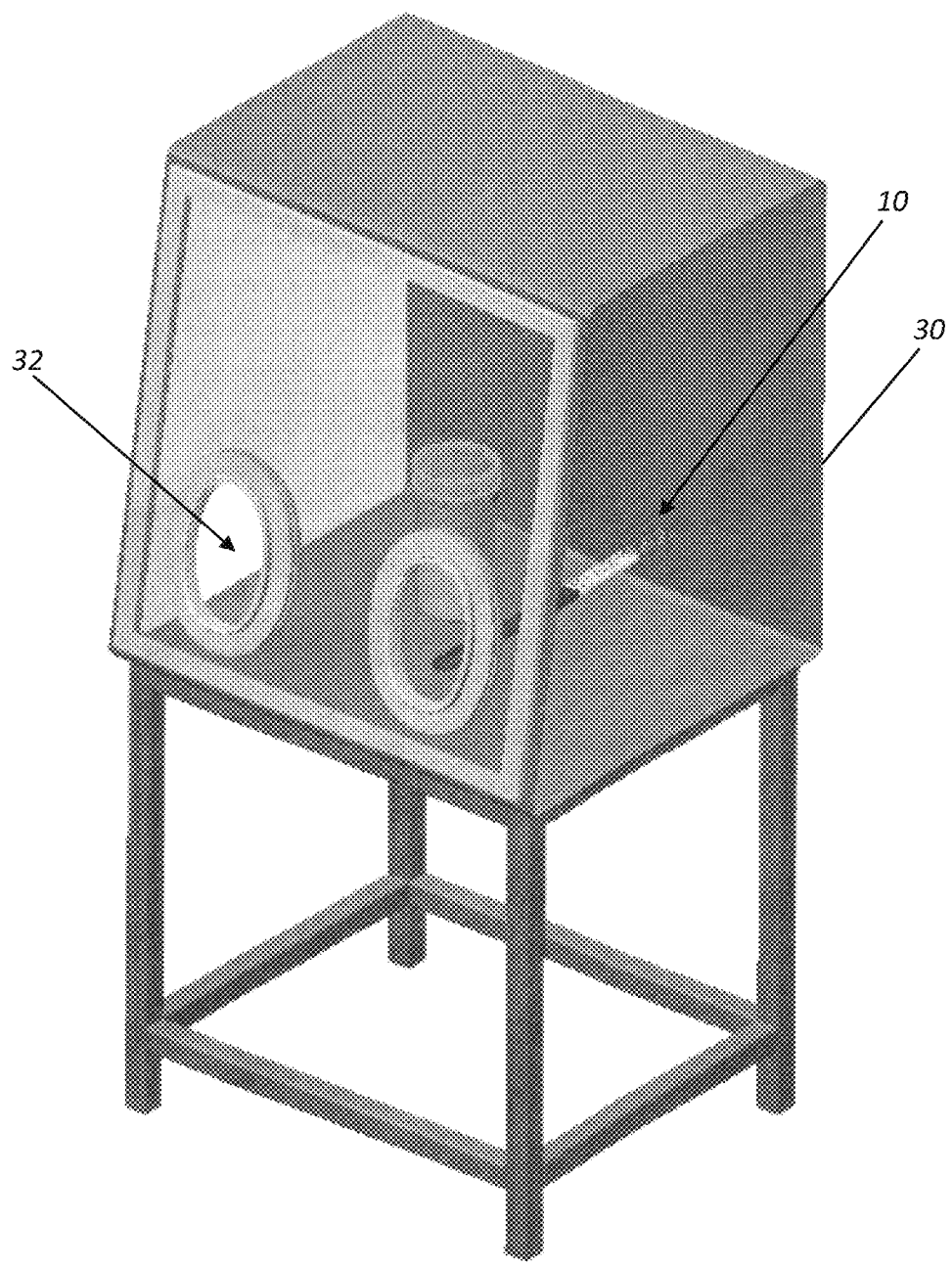
FIG. 4 is a perspective view of one exemplary embodiment of the ergonomic glovebox workspace layout tool of the present invention in use in a glovebox.

FIG. 4 is a perspective view of one exemplary embodiment of the ergonomic glovebox workspace layout tool 10 of the present invention in use in a glovebox 30 including a pair of gloveports 32, the tool temporarily placed in the interior of the glovebox 30.

Figure 5:
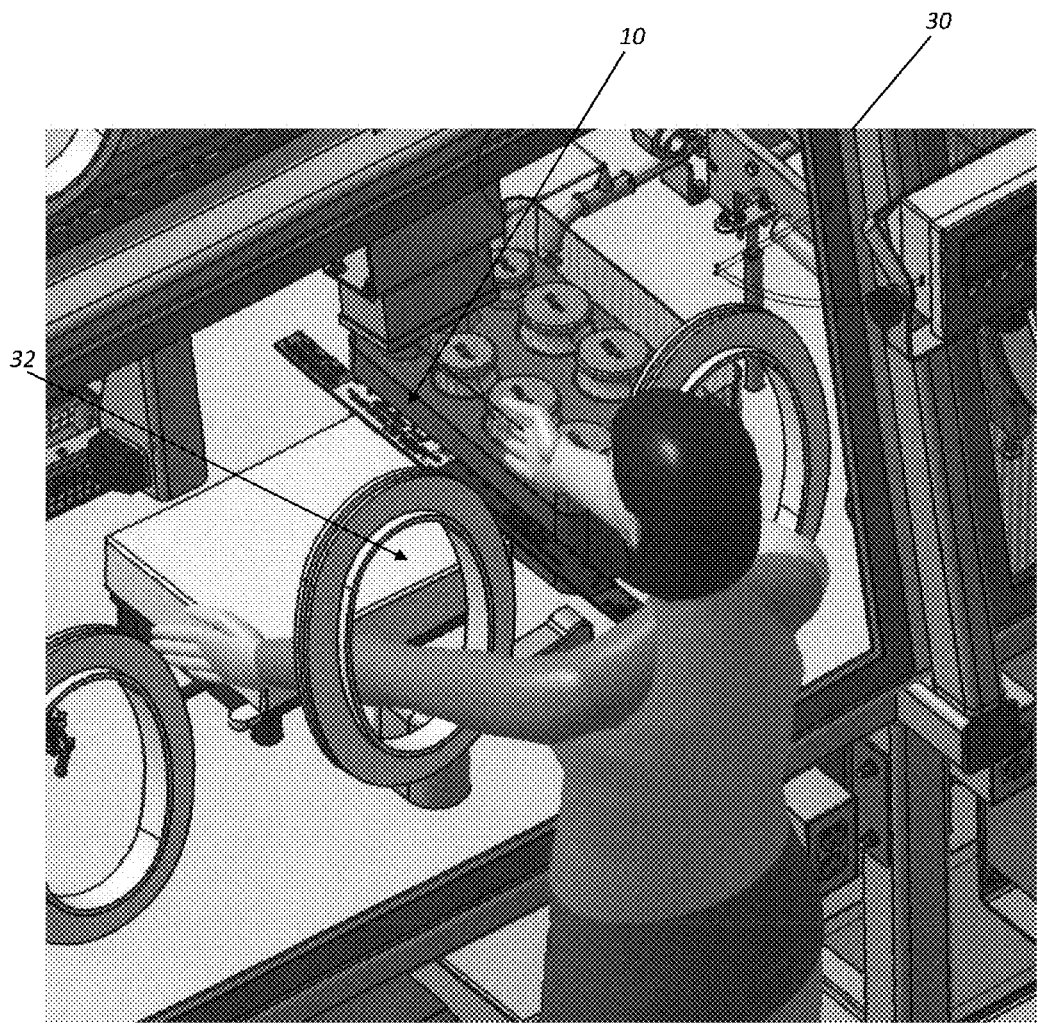
FIG. 5 is a perspective view of one exemplary embodiment of the ergonomic glovebox workspace layout tool of the present invention in use in a glovebox with a user present for perspective.

FIG. 5 is a perspective view of one exemplary embodiment of the ergonomic glovebox workspace layout tool 10 of the present invention in use in a glovebox 30 including a pair of gloveports 32 with a user present for perspective, the tool temporarily placed in the interior of the glovebox 30.

It will be readily apparent to those of ordinary skill in the art that the tool of the present invention could also be used in non-environmentally sealed equivalents of a glovebox as well.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. An ergonomic glovebox workspace layout tool, comprising:
   an elongate body; and
   a plurality of visual zones defined along one or more surfaces of the elongate body, wherein the plurality of visual zones correspond to a plurality of ergonomic horizontal reach zones associated with a user.

2. The tool of claim 1, further comprising:
   a plurality of visual markings disposed along one or more surfaces of the elongate body.

3. The tool of claim 1, wherein the elongate body comprises a prismatic structure.

4. The tool of claim 1, wherein the elongate body is manufactured from one of a non-metallic material and a metallic material.

5. The tool of claim 1, wherein the plurality of visual zones comprise at least three zones indicating a preferred placement zone, a less preferred placement zone, and a disfavored placement zone.

6. The tool of claim 1, wherein the plurality of visual zones further comprise an avoid zone.

7. The tool of claim 1, wherein the plurality of visual zones are color coded.

8. The tool of claim 1, wherein the plurality of visual zones are grayscale coded.

9. The tool of claim 1, wherein the plurality of visual zones are sized and located according to one or more of user sex, user size, object to be placed, and application.

10. The tool of claim 1, further comprising a string coupled to one end of the elongate body for withdrawing the tool from a glovebox.

11. An ergonomic glovebox workspace layout method, comprising:
    providing a tool comprising:
       an elongate body; and
       a plurality of visual zones defined along one or more surfaces of the elongate body, wherein the plurality of visual zones correspond to a plurality of ergonomic horizontal reach zones associated with a user;
    disposing the tool in a glovebox; and
    positioning an object in the glovebox using the plurality of visual zones of the tool as guides.

12. The method of claim 11, the tool further comprising:
    a plurality of visual markings disposed along one or more surfaces of the elongate body.

13. The method of claim 11, wherein the elongate body comprises a prismatic structure.

14. The method of claim 11, wherein the elongate body is manufactured from one of a non-metallic material and a metallic material.

15. The method of claim 11, wherein the plurality of visual zones comprise at least three zones indicating a preferred placement zone, a less preferred placement zone, and a disfavored placement zone.

16. The method of claim 11, wherein the plurality of visual zones are color coded.

17. The method of claim 11, wherein the plurality of visual zones are sized and located according to one or more of user sex, user size, object to be placed, and application.

18. The method of claim 11, the tool further comprising a string coupled to one end of the elongate body for withdrawing the tool from the glovebox.

19. The method of claim 11, further comprising withdrawing the tool from the glovebox subsequent to positioning the object in the glovebox using the plurality of visual zones of the tool.

* * * * *